May 12, 1959   R. H. RIEDEL   2,886,479
SEALING RING AND METHOD OF MAKING SAME
Filed Aug. 2, 1955   2 Sheets-Sheet 1
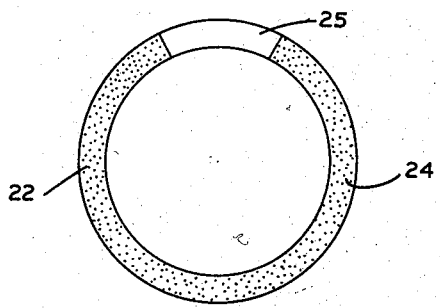
FIG. 1
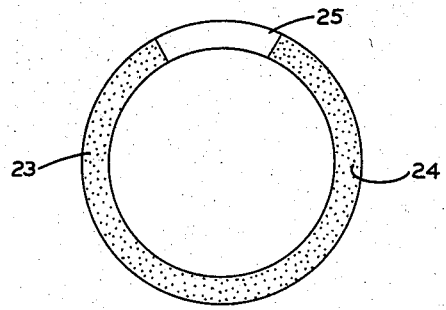
FIG. 2
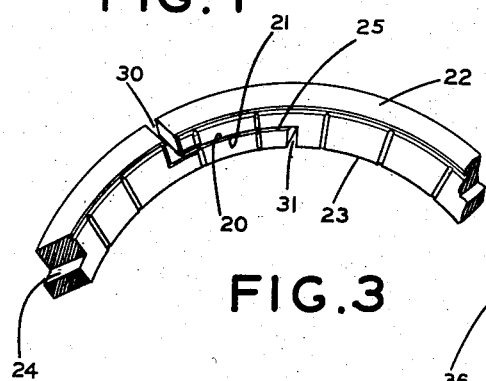
FIG. 3
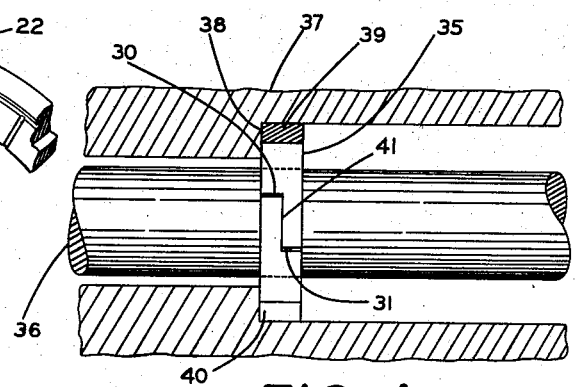
FIG. 4
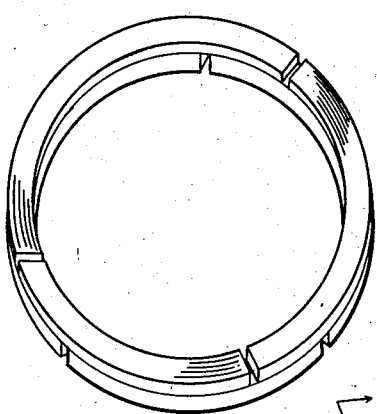
FIG. 5
FIG. 7   FIG. 9
FIG. 8
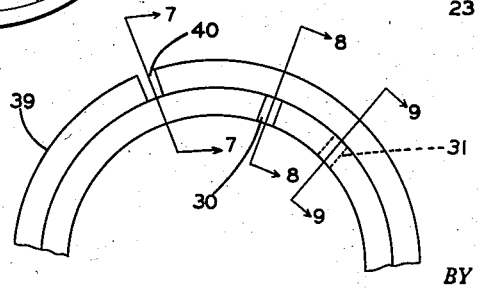
FIG. 6
INVENTOR.
RALPH H. RIEDEL
BY
*Eber J. Hyde*
ATTORNEY May 12, 1959     R. H. RIEDEL     2,886,479
SEALING RING AND METHOD OF MAKING SAME
Filed Aug. 2, 1955     2 Sheets-Sheet 2
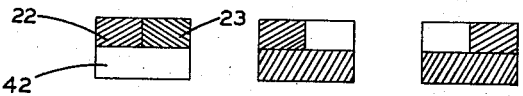
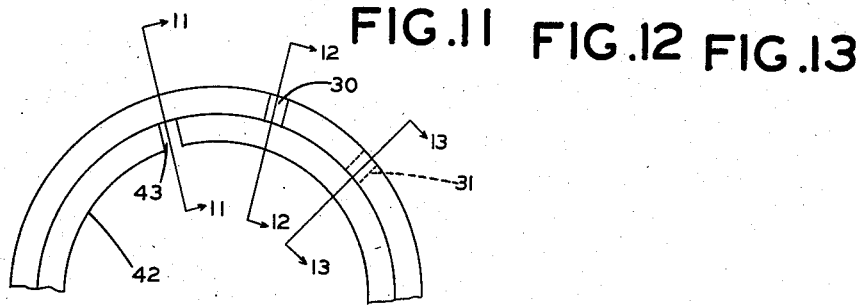
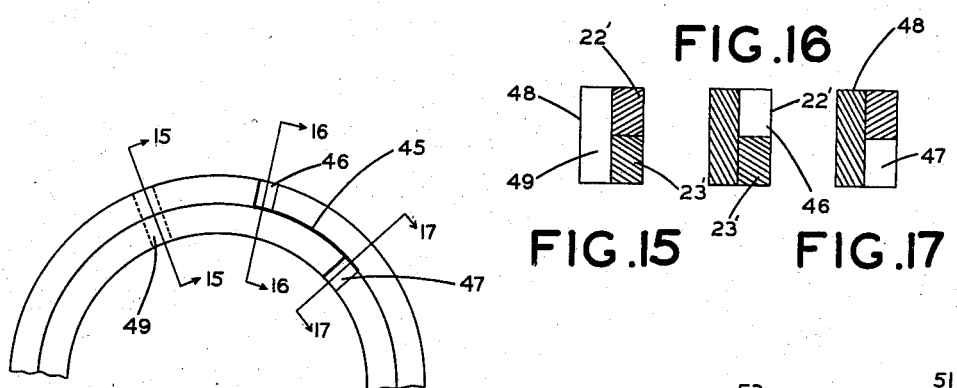
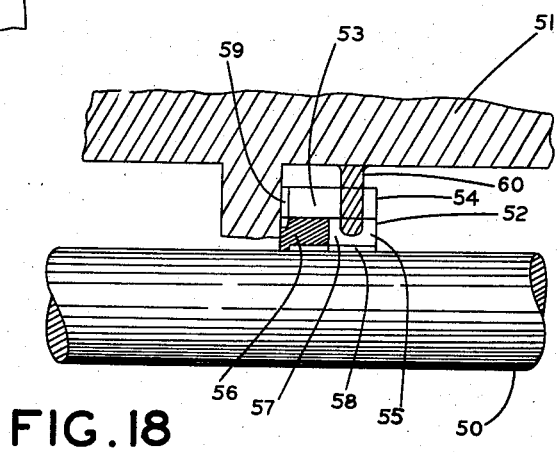
INVENTOR.
RALPH H. RIEDEL
BY
*Eber J. Hyde*
ATTORNEY

United States Patent Office 2,886,479
Patented May 12, 1959

2,886,479

SEALING RING AND METHOD OF MAKING SAME

Ralph H. Riedel, East Cleveland, Ohio, assignor to Clevite Corporation, Cleveland, Ohio, a corporation of Ohio Application August 2, 1955, Serial No. 525,999

6 Claims. (Cl. 154—81)

This invention pertains to a sealing ring such, for example, as a carbon sealing ring or a metal piston ring or the like.

In the past sealing rings have been constructed with a zig-zag or off-set expansion gap having a central section wherein two faced portions of the ring engage each other to prevent the passage of the fluid being sealed.

It is an object of the present invention to provide a sealing ring or the like having an off-set expansion gap section wherein the two faced portions which engage each other to establish the fluid seal are highly accurate plane surfaces which provide a superior seal.

Another object of the present invention is to provide a method for making the engaging face portions of the off-set gap very smooth thereby to provide a more effective fluid seal.

A further object of the present invention is to provide a method for making an inexpensive yet effective sealing ring having an off-set expansion gap portion.

A further object of the present invention is to provide a new and improved sealing ring formed from a plurality of overlapping ring portions.

For a better understanding of the present invention, together with other and further objects thereof, reference is had to the following description taken in connection with the accompanying drawings, and its scope will be pointed out in the appended claims.

One aspect of the present invention is the provision of a method for making a sealing ring which includes the steps of providing two solid rings each of which has an accurately lapped face. A bonding agent is applied to a portion only of the smooth face of at least one of these two rings and the two rings are cemented together face to face over the area covered by the adhesive. The two rings are not cemented together over the face area which is not covered by the adhesive. Thereafter, the composite ring is machined to final tolerances and final smoothness, if necessary, and one of the two original rings is severed from an outer face entirely through to its cemented face at a location adjacent one end of the uncemented area. The other of the two original rings is likewise severed from its outer face completely through to its cemented face at a location adjacent the other end of the uncemented area. This frees the expansion gap providing two adjacent faces which have been lapped very smooth and which are in engagement with each other to prevent the passage of fluid.

Another aspect of the invention is the provision of a sealing ring comprising an annular body formed of two rings cemented together face to face having an inner exposed axially extending face and an opposite outer exposed axially extending face, and also having two exposed opposite end faces which define planes perpendicular to the axis of the annular body; the annular body having an off-set split extending through it from one exposed face to its opposite exposed face. This off-set split provides for limited circumferential expansion and contraction of the annular body yet maintains a fluid sealing contact between overlapping portions of the annular body. The aforesaid annular body is in combination with an annular ring, preferably formed of the same material, which is mounted in fixed position adjacent one of the exposed faces of the annular body and the annular ring has an expansion gap through it located at a point spaced away from at least a portion of the off-set split.

With reference to the drawings, there is shown in Figures 1 and 2 two rings which when cemented together face to face and then machined form the sealing ring.

Figure 3 is an isometric view of the off-set gap portion of the sealing ring.

Figure 4 is a side view partially broken away showing the sealing ring in its operative position.

Figure 5 is an isometric view of a modified type of sealing ring.

Figure 6 is a side view of a portion of a sealing ring showing the gap area.

Figures 7, 8, and 9 are sectional views taken along lines 7—7, 8—8, and 9—9 respectively of Figure 6.

Figure 10 is a side view of the gap area of a modified sealing ring.

Figures 11, 12, and 13 are sectional views taken along lines 11—11, 12—12, 13—13.

Figure 14 is a side view of the gap portion of another modified type of sealing ring.

Figures 15, 16, and 17 are sectional views taken along lines 15—15, 16—16, and 17—17 respectively of Figure 14.

Figure 18 is a fragmentary section of a sealing ring mounted for operation particularly showing one means for pinning the rings together.

With reference to the drawings, there is shown in Figure 3 is a zig-zag or off-set expansion gap portion of a sealing ring. In order to obtain a good seal against the transmission of fluid such as gasses or liquids, it is essential that the overlapping faces identified by reference characters 20 and 21 be very accurate in engagement with each other. The present invention provides a method which is inexpensive but very effective in establishing smooth overlapping faces 20, 21 at the expansion gap of a sealing ring.

The steps in the method are as follows: Two solid rings are provided such as those shown in Figures 1 and 2. These rings may be made of carbon, carbon compounds, metal or the like. If the zig-zag sealing joint is to extend axially of the sealing ring as shown in Fig. 3, it is desirable that the two rings be identical in size. If the zig-zag sealing joint is to extend from the outer diameter to the internal diameter as shown in Fig. 14, then the smaller of the rings should be of such size that it nests closely against the internal diameter of the larger ring.

The method illustrated is that adapted to the formation of a sealing ring having the axially extending gap. The two rings 22, 23 shown in Figures 1 and 2 are substantially identical in size. One of the end faces of each of these two rings is lapped until it is very smooth. An adhesive material 24 is applied to a portion only of the smooth face of one or both of the rings 22, 23. For example, as shown in Figures 1 and 2, an angular portion 25 extending over an angle of about 55° is free from adhesive material. The two rings are then cemented together face to face over the entire area to which adhesive has been applied, leaving uncemented the area 25. Thereafter finish machining is performed, if necessary, to bring the sealing ring to final tolerances or to smooth up its exposed faces.

After the ring has been machined and polished to final tolerances a first gap 30 is cut through ring 22 from its outer face to its cemented face 24 at a location adjacent one end of the uncemented area 25. Either simultaneously with forming the gap 30 or after forming the gap 30, a gap 31 is cut through the other ring 23 from its outer face through to the cemented face 24 at the opposite end of the uncemented area 25. This frees the expansion gap permitting the ring to flex.

The sealing ring 35 thus formed may be used to effect a seal between a shaft 36 and a housing 37 as shown in Figure 4. Preferably the housing has a shoulder portion 38 against which the sealing ring 35 abuts. An annular ring 39 preferably formed of the same material as the ring 35 is applied around the O.D. of the ring 35. The annular ring 39 has an expansion gap 40 which is off-set with respect to the zig-zag sealing gap 41 of the ring 35.

Often it may be desirable to have more than one off-set gap portion in the sealing ring. Thus there is shown in Figure 5 a sealing ring having three equally spaced expansion gap portions. Such a ring is used where a substantial amount of wear is expected or where an out-of-round journal must be effectively sealed. It also has advantages when large journal diameters must be sealed, where as many as six segments may be used. Such a ring does not hold together by itself but ways and means are known in the art for mounting such rings between a housing and a relatively rotating shaft.

Figures 6 and 9 show the gap portion of a sealing ring comprised of two rings 22, 23 cemented together face-to-face in accordance with the method heretofore described, and an annular ring 39 mounted in a fixed position adjacent the outer diameter of the composite ring 22, 23 as shown in Figure 4. In this construction the ring 39 may actually be cemented to the composite ring 22, 23 or the outer ring 39 may merely be pinned in an indexed position with respect to the composite ring 22, 23. The indexed position should be such, according to the seal desired, and that there is no fluid passageway through gap 40 and through either gap 30 or 31. It is oftentimes permissible to have the gap 40 fall between gaps 30 and 31 and it is sometimes permissible to have gap 40 register with either gap 30 or 31. However, gap 40 should be spaced away from at least a portion of the zig-zag gap 25 in order to provide effective sealing.

Figures 10-13 show a construction somewhat similar to that shown in Figures 6-9 but in this modified form the annular ring 42 is mounted inside the annular body formed by cementing together the two rings 22, 23. The annular ring 42 has a gap 43 which is off-set with respect to at least a portion of the zig-zag sealing gap. The construction shown in Figures 6-9 is particularly adapted to seal on the O.D. of a journal while the construction shown in Figures 10-13 is more particularly adapted to sealing within a bore.

Figures 14-17 show a sealing ring construction wherein the zig-zag sealing gap formed between the two cemented together rings 22' and 23' extends in a direction from the I.D. to the O.D. of the composite ring. This zig-zag gap area is identified by reference character 45 in Figure 14 and is comprised of two gaps 46 and 47. The annular ring 48 is then mounted in fixed position adjacent to the broad side face of the composite ring 22, 23. This mounting, as has previously been mentioned, may be either by cementing or by pinning the ring 48 to the composite ring. The annular ring 48 is provided with an expansion gap 49 which is off-set with respect to at least a portion of the zig-zag split in the composite ring 22', 23'. The device shown in Figures 14-17 may be used for sealing the O.D. of a journal or the I.D. of a bore.

Figure 18 illustrates one method of pinning the annular ring to the composite sealing ring. The journal 50 which is to be sealed within a housing 51 has mounted around it the composite sealing device identified generally by reference character 52. In the structure shown, the gap 53 in the outer annular ring 54 registers with the gap 55 in one of the two cemented together rings 56, 57. Pressure balancing grooves 58 and 59 are provided as shown. A pin 60 is secured to the housing 51 and extends down into the gaps 53, 55 thereby holding the annular ring 54 with respect to the composite sealing ring 56, 57.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In the method of making a sealing ring, the steps of: providing two solid rings each having a smooth face, applying an adhesive to a portion only of at least one of said smooth faces, cementing said two rings together face-to-face over the area covered by said adhesive leaving an area throughout which the rings are not cemented together, severing one of said rings from an outer face to its cemented face at a location adjacent one end of said uncemented area, and severing the other of said rings from an outer face to its cemented face at a location adjacent the other end of said uncemented area.

2. The method of making a sealing ring as set forth in claim 1, further characterized by the rings being of different diameter and by the O.D. of the smaller of said two rings being substantially equal to the I.D. of the larger of said two rings whereby the smaller ring nests within the larger ring.

3. In the method of making a sealing ring, the steps of: providing two solid rings of substantially equal diameter each having a smooth side face, applying an adhesive to a portion only of at least one of said smooth side faces, cementing said two rings together face-to-face over the area covered by said adhesive leaving an area throughout which the rings are not cemented together, severing one of said rings from its outer face to its cemented face at a location adjacent one end of said uncemented area, and severing the other of said rings from its outer face to its cemented face at a location adjacent the other end of said uncemented area.

4. In the method of making a sealing ring, the steps of: providing two solid rings of substantially equal diameter, machining one side face of each said rings to make it smooth, applying an adhesive to a portion only of at least one of said machined faces, cementing said two rings together face-to-face over the area covered by said adhesive leaving an area throughout which the rings are not cemented together, severing one of said rings from its outer face to its cemented face at a location adjacent one end of said uncemented area, and severing the other of said rings from its outer face to its cemented face at a location adjacent the other end of said uncemented area.

5. In the method of making a sealing ring, the steps of: providing two solid rings of substantially equal inner and outer diameter each having a smooth side face, applying an adhesive to a portion only of at least one of said smooth side faces, cementing said two rings together face-to-face over the area covered by said adhesive leaving an area throughout which the rings are not cemented together, finish machining the inner diameter face and the outer diameter face, severing one of said rings from its outer face to its cemented face at a location adjacent one end of said uncemented area, and severing the other of said rings from its outer face to its cemented face at a location adjacent the other end of said uncemented area.

6. In the method of making a sealing ring, the steps of: providing two solid rings of substantially equal inner and outer diameter each having a smooth side face, applying an adhesive to a plurality of areas on at least one of said smooth side faces leaving a plurality of intermediate areas uncovered by said adhesive, cementing said two rings together face-to-face over the areas covered by said adhesive leaving a plurality of intermediate areas throughout which the rings are not cemented together, finish machining said cemented together rings, severing one of said rings at a plurality of locations each adjacent one end of one of said intermediate areas from its outer face through to its cemented face, and severing the other ring at a plurality of locations each adjacent the other end of one of said intermediate areas from its outer face through to its cemented face.

References Cited in the file of this patent

UNITED STATES PATENTS

| | | |
|---|---|---|
| 925,459 | Cook | June 22, 1909 |
| 1,219,270 | Dunham | Mar. 13, 1917 |
| 1,348,640 | Hachmann | Aug. 3, 1920 |
| 1,561,310 | Corke | Nov. 10, 1925 |